July 29, 1952
W. A. JANVRIN, JR
2,605,424
BLOCKING OSCILLATOR
Filed Feb. 20, 1946
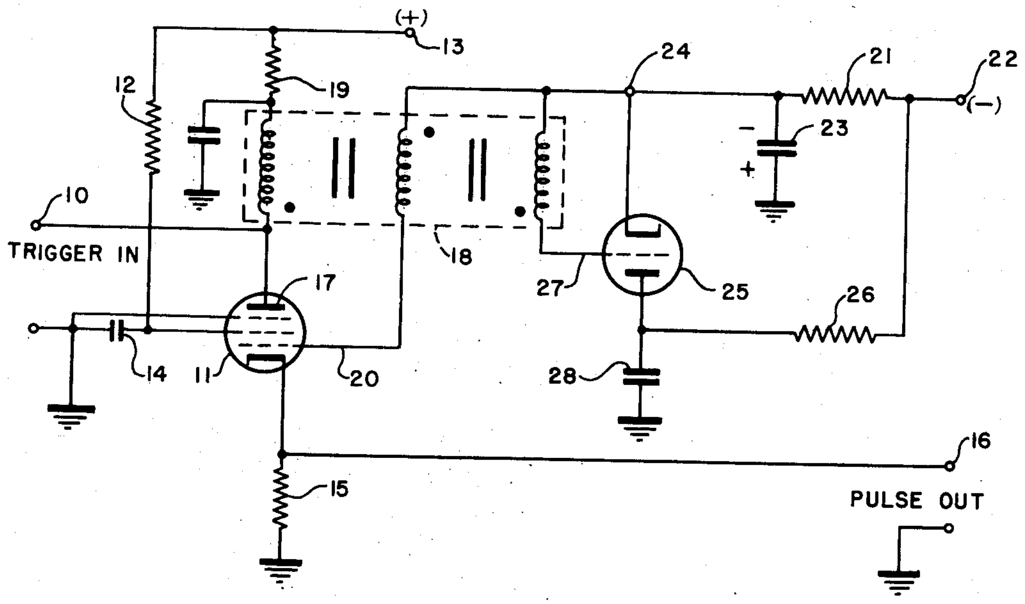
INVENTOR
WALTER A. JANVRIN JR.
BY M. A. Hayes
ATTORNEY Patented July 29, 1952 2,605,424

UNITED STATES PATENT OFFICE 2,605,424

BLOCKING OSCILLATOR

Walter A. Janvrin, Jr., Cambridge, Mass., assignor, by mesne assignments, to the United States of America as represented by the Secretary of the Navy Application February 20, 1946, Serial No. 649,089

8 Claims. (Cl. 250—36)

This invention relates to a blocking oscillator and more particularly to a blocking oscillator with a short recovery time.

In previous blocking oscillator circuits difficulty has been encountered with the recovery time of the grid of the blocking oscillator to its quiescent potential. During the period of recovery, the potential of the grid is below its quiescent bias and as a consequence the oscillator cannot be triggered by normal size pulses. In many applications in the radar field this is a serious disadvantage. An important example would be radar beacons. To give maximum service the beacon should reply to every interrogation. If, however, there is a recovery time in the blocking oscillator following the beacon receiver, any second interrogation occurring during the period of recovery would go unanswered. Another example would be the case wherein a blocking oscillator was a part of the modulator circuit of a radar system. The importance of a short recovery time is apparent when one considers that the recovery time places the maximum limit on the repetition rate of the system, i. e. the shortest repetition period of the radar system cannot be less than the recovery time of the blocking oscillator.

Accordingly, it is an object of this invention to improve the operation of blocking oscillators by decreasing recovery time.

Another object of this invention is to provide a circuit which may be incorporated into a blocking oscillator circuit to effect a short recovery time without alteration of the normal characteristics of the blocking oscillator.

These and further objects will be more readily evident upon consideration of the following description and the accompanying drawing which discloses one embodiment of the present invention.

The circuit is comprised of a normal blocking oscillator to which has been added an auxiliary circuit structure to decrease recovery time. The normal blocking oscillator of this embodiment includes input terminal 10 which feeds negative trigger pulses to plate 17 of blocking oscillator tube 11. Tube 11 is, in this embodiment, a pentode. The suppressor grid is grounded; the screen grid is returned through suitable resistor 12 to a positive voltage source connected at terminal 13 and is by-passed to ground by capacitor 14; and the cathode is returned to ground through load resistor 15 across which the output pulse is formed and fed to output terminal 16. Plate 17 is also connected to one end of the first winding of three-winding pulse transformer 18, the other end of which is in turn connected through resistance-capacitance decoupling network 19 to the positive voltage source connected at terminal 13. Grid 20 is connected through a second winding of transformer 18 and subsequently through resistor 21 to a negative bias voltage source connected at terminal 22. This bias voltage is by-passed to ground by capacitor 23 at junction point 24 of resistor 21 and the second winding of transformer 18, effectively creating a resistance-capacitance filter.

The auxiliary circuit includes the third winding of transformer 18, one end of which is connected to junction point 24; and triode 25, the cathode of which is connected to junction point 24, the grid of which is connected to the other end of the third winding of transformer 18, and the plate of which is connected through resistor 26 to the negative voltage source connected at terminal 22 and which is by-passed to ground by capacitor 28, effectively creating a second resistance-capacitance filter.

The operation of this circuit is initiated by the impression of a negative trigger on input terminal 10. This trigger lowers the instantaneous voltage at the plate of tube 11 and in so doing establishes a voltage across the plate winding of transformer 18. This then establishes a voltage in the grid winding which, by reason of the indicated polarity of the windings, is positive on the grid end. This starts a flow of plate current in tube 11 which in turn creates a voltage in the plate winding of transformer 18. This is seen to be a regenerative process, and it will continue until tube saturation is reached. At this point further increase in grid voltage does not increase plate current. The consequent decrease in rate of change of plate current decreases the voltage in the plate winding of transformer 18. This in turn decreases the voltage in the grid winding and the regenerative process reverses, the tube cuts off, and the output pulse is delivered at terminal 16. During the time in which the positive voltage is applied to grid 20, current flows through capacitor 23, the grid winding of transformer 18, the grid-to-cathode impedance of tube 11, and cathode resistor 15. This flow of current charges capacitor 23 with the polarity indicated on the drawing.

In the absence of the auxiliary circuit, the recovery time of this much of the circuit would be determined by the discharge time of capacitor 23, which in turn would be determined by the product of the values of capacitor 23 and resistor 21. The elimination of the difficulties resulting from long recovery time is the function of the auxiliary circuit which discharges capacitor 23 to the proper quiescent value in a very short time. During the time grid 20 is positive a voltage is established in the third winding of transformer 18 which is negative at the end attached to grid 27 of triode 25. This negative voltage prevents conduction of tube 25 which would otherwise be occasioned by the negative voltage being established at junction point 24 as a result of the charge being developed on capacitor 23. The auxiliary circuit, then, alters none of the characteristics of the blocking oscillator during the period in which the pulse is being formed. When the previously mentioned regenerative process reverses, however, the field within transformer 18 collapses and takes away the negative voltage from grid to cathode of triode 25. This allows triode 25 to conduct and in so doing to discharge rapidly capacitor 23 to the voltage value established across capacitor 28, which value is the quiescent bias of the grid circuit by reason of the connection to the bias source through resistor 26. The disclosed circuit is thus seen to provide a circuit structure for producing blocking oscillator pulses and at the same time providing rapid recovery times, experimental values for which have been as low as 0.6 microseconds.

The foregoing description has presented an explanation of this invention in the particular application of a blocking oscillator with extremely short recovery time, but the principles of this invention are of broader application in ways which will be apparent to those skilled in the art. It will be understood that the above disclosed embodiment is primarily illustrative and that the invention includes such other embodiments as fairly come within the spirit and scope of the appended claims.

What is claimed is:

1. An electrical circuit comprising, a positive voltage source; a negative voltage source; a junction point; a first tube including cathode, plate, and grid electrodes; a three-winding pulse transformer, two of said windings being similarly poled and the third oppositely poled; a resistance-capacitance decoupling network connected at the resistance end to said positive voltage source and at the capacitor end to the low signal voltage end of the first winding of said pulse transformer, said first winding being connected at its high signal voltage end to said plate of said first tube; an input terminal also connected to said plate of said first tube; a load resistor connecting said cathode of said first tube to ground; an output terminal connected to said cathode of said first tube; said second winding of said pulse transformer being connected at its low signal voltage end to said grid of said first tube and at its high signal voltage end to said junction point; a first resistance-capacitance filter connected at the capacitor end to said junction point and at the resistor end to said negative voltage source; a second tube having grid, cathode, and plate electrodes; said cathode of said second tube being connected to said junction point; said third winding of said pulse transformer being connected at its high signal voltage end to the grid of said second tube and at its low signal voltage end to said junction point; and a second resistance-capacitance filter, the capacitor end of which is connected to said plate of said second tube and the resistance end of which is connected to said negative voltage source, wherein said circuit provides a blocking oscillator with an extremely short recovery time.

2. In combination with a blocking oscillator, said blocking oscillator comprising, an electron tube having at least an anode and a grid, coupled grid and anode circuits, and a capacitor coupled to said grid circuit, the discharge time of said capacitor determining the recovery time of said oscillator, auxiliary apparatus for providing said capacitor with a relatively low resistance discharge path compared to the path provided by the oscillator without said auxiliary apparatus, said auxiliary apparatus comprising, means coupled to said grid circuit for obtaining a control voltage, switching means responsive to said control voltage for closing a normally open circuit, said circuit when closed providing said capacitor with a relatively low resistance discharge path.

3. In combination with a blocking oscillator, said oscillator comprising, an electron tube having at least an anode and a grid, coupled grid and anode circuits, and a capacitor coupled to said grid circuit, said capacitor being charged during the formation of a pulse and being discharged after the termination of a pulse, the recovery time of said oscillator being a function of the discharge time of said capacitor, apparatus for providing said oscillator with a relatively low resistance discharge path whereby the recovery time of said oscillator is correspondingly short, comprising, means coupled to the grid circuit of said oscillator for obtaining a control voltage, said control voltage being negative during the formation of an oscillator pulse and positive after the termination of said oscillator pulse, switching means associated with said capacitor and responsive to said control voltage providing a relatively low resistance discharge path for said capacitor at the instant said control voltage becomes positive.

4. In combination with a blocking oscillator adapted to produce an output pulse in response to the application of an input trigger pulse, said blocking oscillator comprising, an electron tube having at least an anode and a grid, regeneratively coupled grid and anode circuits, and a capacitor in the grid-cathode circuit adapted to charge during the formation of a pulse and further adapted to discharge through a resistor and a grid biasing potential source after the termination of said pulse, the recovery time of said oscillator being a function of the discharge time of said capacitor, apparatus for reducing the recovery time of said oscillator by reducing the discharge time of said capacitor, comprising, means coupled to said regeneratively coupled circuits for obtaining a negative pulse during the formation of an oscillator pulse and a positive pulse at the termination of said oscillator pulse, means responsive to said positive pulse for providing said capacitor with a relatively low resistance discharge path compared to the path provided by said resistor and said biasing potential source, whereby the discharge time of said capacitor is lowered and said recovery time is correspondingly reduced.

5. In combination with a blocking oscillator including an electron tube having at least an anode and a grid, coupled anode and grid circuits, and a capacitor coupled to said grid circuit, said capacitor being arranged to charge during the formation of a pulse and to discharge after the termination of said pulse, the discharge time of said capacitor determining the recovery time of said oscillator, auxiliary apparatus comprising, means coupled to said grid circuit for obtaining a negative control voltage during the formation of a pulse and a positive control voltage after the termination of the pulse, switching means operatively associated with said capacitor and responsive only to said positive control voltage for providing a relatively low resistance discharge path for said capacitor, and means quiescently biasing said grid beyond cutoff.

6. In combination, a blocking oscillator for generating output pulses in response to a trigger pulse including a first electron tube having at least an anode, a cathode and a control grid, a transformer having three windings, two of said windings coupling the anode circuit to the grid circuit of said first tube in a regenerative manner, a capacitor in the grid circuit of said first tube, a discharge resistor associated with said capacitor and connected to a source of negative potential, a second electron tube having at least an anode, a cathode and a control grid, means connecting the cathode of said second tube to the junction of said capacitor and said resistor, the third winding of said transformer being connected between the grid circuit of said first tube and the control grid of said second tube, and means resistively coupling the anode of said second tube to said source of negative potential, said third winding being poled similarly to the winding in the anode circuit of said first tube whereby a negative voltage is applied to the control grid of said second tube during the generation of a pulse in said oscillator to render said said tube non-conducting and a positive voltage is applied to said grid at the termination of the pulse to render said second tube conducting, thereby providing a low resistance discharge path for said capacitor, and reducing the recovery time of said oscillator.

7. In combination, a blocking oscillator including a first electron tube having at least an anode, a cathode and a control grid, a transformer having first, second and third windings, said first and third windings being similarly poled and said second winding being oppositely poled, means connecting said first winding between the anode of said first tube and a source of positive potential, a load resistor connected between the cathode of said first tube and ground, a source of negative potential, a resistor, means serially connecting said second winding and said resistor between the grid of said first tube and said source of negative potential, and a capacitor connected between the junction of said second winding with said resistor and ground, said negative potential being of a value normally to bias said first tube beyond cutoff whereby said oscillator generates pulses only upon application of positive pulses to the anode thereof, a second electron tube having at least an anode, a cathode and a control grid, means connecting said third winding between said junction and the control grid of said second tube, means connecting the cathode of said second tube to said junction, and means resistively coupling the anode of said second tube to said source of negative potential, whereby said second tube is rendered non-conducting during the formation of a pulse in said blocking oscillator and conducting at the termination of the pulse to provide a low resistance discharge path for said capacitor thereby to reduce the recovery time of said oscillator.

8. In combination, a triggered blocking oscillator including a first electron tube having at least an anode, a cathode and a control grid, a pulse transformer having three windings, two of which are similarly poled and a third of which is oppositely poled, two oppositely poled windings of said transformer coupling the anode circuit to the grid circuit of said first tube in a regenerative manner, a capacitor connected in the grid circuit of said first tube, and a load resistor connected in the cathode circuit of said first tube, whereby said first tube generates pulses upon application of trigger pulses to the anode thereof, a second electron tube having at least an anode, a cathode and a control grid, means connecting the third winding of said transformer between the grid circuit of said first tube and the control grid of said second tube, means resistively coupling the anode of said second tube to a source of negative potential, and means connecting the cathode of said second tube to the grid circuit of said first tube, whereby said second tube is rendered non-conducting during the formation of a pulse in said blocking oscillator and conducting at the termination of the pulse to provide a low resistance discharge path for said capacitor thereby to reduce the recovery time of said blocking oscillator.

WALTER A. JANVRIN, JR.

REFERENCES CITED

The following references are of record in the file of this patent:

UNITED STATES PATENTS

| Number | Name | Date |
|---|---|---|
| 2,308,908 | Bahring | Jan. 19, 1943 |
| 2,320,551 | Bahring | June 1, 1943 |
| 2,516,533 | Slack | July 25, 1950 |